June 27, 1961   L. J. CLARK   2,989,873
ENGINE STARTING EQUIPMENT
Filed April 14, 1958
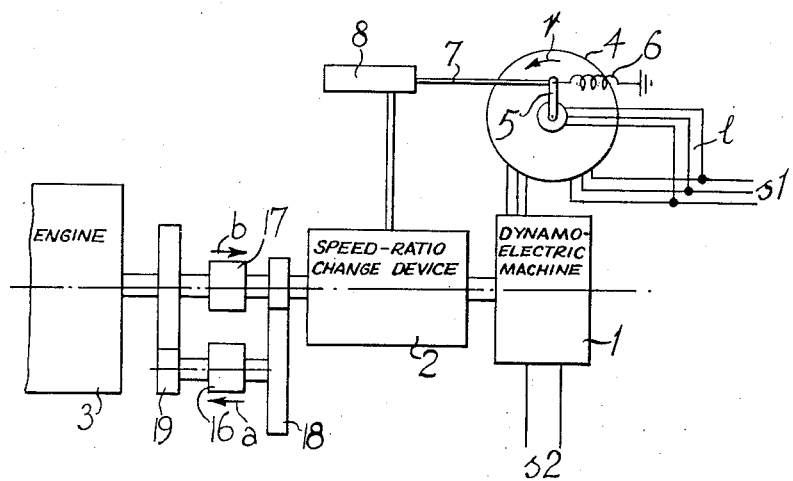
INVENTOR
LEONARD JACK CLARK
ATTORNEY

United States Patent Office 2,989,873
Patented June 27, 1961

2,989,873
ENGINE STARTING EQUIPMENT
Leonard Jack Clark, Bilton, England, assignor to The British Thomson-Houston Company Limited, London, England, a British company
Filed Apr. 14, 1958, Ser. No. 728,300
Claims priority, application Great Britain Apr. 18, 1957
3 Claims. (Cl. 74—365)

This invention relates to drives of the kind including an electric motor, preferably an A.C. motor which may be of a synchronous or asynchronous type combined with a variable ratio speed changing gear. Although not so limited the invention is particularly suitable to serve for starting an aircraft engine, such as a gas turbine, and in this application a dynamo-electric machine which functions as a motor for starting the engine may be arranged to function as a generator driven from the same engine which now runs to act as a prime mover during its normal operation.

Generally this invention resides in a dynamo-electric machine-variable ratio speed changing gear combination, wherein a means is provided to control automatically the ratio of said gear in dependence upon the magnitude of the current flowing through the dynamo-electric machine when operating as a motor, thereby to produce gear ratio changes neutralising load torque changes and to maintain substantially constant the speed of the machine and the electric power drawn by the machine.

In a practical embodiment the control means comprises a dynamo-electric device of the dynamometer kind which has an electric circuit connected to the circuit of the machine operating as a driving motor, thereby to produce a torque in the rotor of the device, a biasing means being provided to define the angular displacement of the said rotor by the said torque in accordance with the current flowing through the machine.

The invention will be better understood and more details thereof will become apparent from the following description referring to the single figure of the accompanying drawing which shows diagrammatically and by way of example an equipment of the kind abovementioned and including a preferred embodiment of the invention.

Referring to the drawing, a dynamo-electric machine 1 suitable to operate as a motor for starting an engine 3 is coupled to the engine through a variable speed ratio, power transmitting device 2 of a conventional kind. The speed ratio of device 2 is variable and settable by an external force and the device is preferably constructed to provide for a zero output speed setting. The device is preferably of a hydraulic kind, and may comprise any desired conventional type, several of which are well known in the art. Intermediary speed reducing and step-up gear trains 18, 19, respectively, are arranged to become effective by the operation of free wheel devices 16, 17 which are known per se, to transmit power in the direction a when the dynamo-electric machine operates as a motor or in the direction b when the dynamo-electric machine operates as a generator.

The means for controlling the speed ratio of the device 2 comprises in this embodiment a torque responsive dynamometer formed by a dynamo-electric device 4 which has a stator winding connected, in series with the armature winding of the motor 1, to a three phase supply $s1$. The field excitation circuit of the motor 1 is connected to a D.C. source $s2$. A rotor winding of the device 4 is connected via leads $l$ to the supply $s1$. The spatial displacement of the stator and rotor windings of the torque responsive device 4 is preferably 90° to produce a high torque response. The rotor of the torque device 4 carries an arm 5 and is biased to a normal angular position by means of a spring 6. The arm 5 is connected through a link 7 to a suitable conventional control device 8 for setting the "constant speed" unit 2 in accordance with the angular position of the arm 5, that is, the control device 8 maintains the desired setting of unit 2 with respect to arm 5.

The torque exerted by the rotor of the device 4 is proportional to $EI \cos \phi$, where E is the supply voltage, I is the current drawn by the motor 1 and $\cos \phi$ is the power factor. The spring 6 is arranged to balance this torque when the driving motor 1 exerts a predetermined torque. If the load torque increases the current I and the power factor increase and the value of $EI \cos \phi$ increases correspondingly, so that the rotor of the torque motor 4 rotates in the direction of arrow r and extends the spring. The member 5 when rotating with the torque motor displaces the control member of the constant speed unit to modify the gear ratio until a state of equilibrium is restored. As can be seen the member 5 is arranged to allow displacement from its initial position in either direction, in order to restore the torque to a required value both from lower and higher values.

During the starting period the unit 2 is preferably set to supply zero output speed and until the motor 1 runs up to full speed. The initial setting is then released and the torque responsive device is brought into action so that the motor can now drive the load, first at a very low speed as defined by the unit 2 and the load value. As the speed of the load increases and the torque decreases the torque responsive device 4 modifies continuously the speed ratio afforded by the unit 2 so as to maintain the motor torque at a predetermined value as defined by the force biasing the rotor of the torque responsive device 4. This control will continue until the prime mover starts its normal operation. When the load on the motor becomes zero the unit 2 moves rapidly to the end of its ratio range, at which position the motor ceases to drive the load, the free-wheel device 16 decouples the drive in the direction a, and the free-wheel device 17 connects the engine 3 to drive the machine 1 now operating as generator, in a manner known in the art, while the gear ratio of the unit 2 can be controlled by means of a conventional governor.

Modifications are possible without departure from this invention. The range of the unit 2 need not be extended to provide for zero output speed, and in order to meet individual requirements a "constant speed" gear, that is a variable ratio gear which permits changing the speed at one end while the speed at the other end of the gear is substantially constant, of any suitable kind known in the art can be used in a combination according to the invention.

I claim:
1. A drive unit comprising a dynamo-electric machine, a speed change gear affording substantially stepless variation of the gear ratio over a predetermined range, means responsive to the current drawn by said dynamo-electric machine and including a member providing continuous movement in two opposite directions as the current drawn by said dynamo-electric machine increases and decreases when said machine operates as a motor, said speed change gear including a member connected to said current responsive means member so as to follow its movement to cause a gear ratio change in the input-to-output step-down sense when movement of said current responsive means member corersponds to an increase of the current drawn by said dynamo-electric machine and to change said ratio in the opposite sense when the movement of said latter member corresponds to a decrease in the current drawn by said dynamo-electric machine.

2. A drive unit as claimed in claim 1 wherein said dynamo-electric machine has an armature winding, said current responsive means comprises a dynamo-electric device having a rotor and a stator with a stator winding connected in series with said dynamo-electric machine armature winding, a biasing means connected to said rotor of said dynamo-electric device for counteracting torque developed by the field of said stator winding so that the position of said rotor corresponds to the magnitude of said dynamo-electric machine current.

3. A drive unit as set forth in claim 1 provided with a speed change gear train, and a free wheeling device connecting said gear train to said speed change gear to provide a stepping-down effect when said dynamo-electric machine operates as a driving motor and a stepping-up effect when said dynamo-electric machine operates as a driven generator.

References Cited in the file of this patent

UNITED STATES PATENTS

| | | |
|---|---|---|
| 1,132,478 | Johnson | Mar. 16, 1915 |
| 1,427,301 | Kloneck | Aug. 29, 1922 |
| 2,886,987 | Papst | May 19, 1959 |